United States Patent [19]

Issa

[11] Patent Number: 5,712,638
[45] Date of Patent: Jan. 27, 1998

[54] MULTIPLE TRANSMISSION CHANNEL GROUP TRANSMITTER

[75] Inventor: Darrell Issa, Vista, Calif.

[73] Assignee: Directed Electronics, Inc., Vista, Calif.

[21] Appl. No.: 451,855

[22] Filed: May 26, 1995

Related U.S. Application Data

[63] Continuation-in-part of Ser. No. 945,667, Sep. 16, 1992, Pat. No. 5,534,845, Ser. No. 112,940, Aug. 30, 1993, Pat. No. 5,532,670, Ser. No. 433,819, May 4, 1995, Ser. No. 396,020, Feb. 28, 1995, Ser. No. 396,115, Feb. 28, 1995, and Ser. No. 425,597, Apr. 20, 1995.

[51] Int. Cl.⁶ ............................................. G08C 19/12
[52] U.S. Cl. ............... 341/176; 340/825.03; 340/825.37; 341/20; 341/173
[58] Field of Search ................... 341/176, 23, 20, 341/173; 340/825.72, 825.22, 425.15, 825.03; 348/734

[56] References Cited

U.S. PATENT DOCUMENTS

| | | | |
|---|---|---|---|
| 4,202,038 | 5/1980 | Peterson | 341/23 |
| 4,481,503 | 11/1984 | Kamez | 341/23 |
| 4,745,397 | 5/1988 | Lagerbauer | 341/23 |
| 4,825,209 | 4/1989 | Sasaki | 340/825.72 |
| 4,965,557 | 10/1990 | Schepers | 341/23 |
| 5,258,748 | 11/1993 | Jones | 341/176 |
| 5,367,316 | 11/1994 | Ikezaki | 348/734 |
| 5,451,953 | 9/1995 | Duffield | 341/176 |
| 5,457,448 | 10/1995 | Totsuka | 341/176 |
| 5,491,472 | 2/1996 | Kurtz | 340/825.57 |

FOREIGN PATENT DOCUMENTS

| | | | |
|---|---|---|---|
| 57-92991 | 11/1980 | Japan | 341/176 |
| 59-119995 | 12/1982 | Japan | 341/176 |
| 63-129715 | 11/1986 | Japan | 341/176 |

*Primary Examiner*—Jeffrey Hofsass
*Assistant Examiner*—Albert K. Wong
*Attorney, Agent, or Firm*—Sam Talpalatsky

[57] ABSTRACT

A remote control transmitter comprising at least one transmission channel for transmitting a code word to a system controller and for operating system operational functions controllable thereby; a plurality of transmission channel groups, each group having at least one transmission channel therein; at least one switch for activation of the transmitter, said switch having an operational mode and a standby mode; means for transmitting the code word to the controller and activated upon transition of the switch from the operational mode to the standby mode; and, using the same switch or switches both for selecting the channel group and for transmitting channel commands.

29 Claims, 2 Drawing Sheets

MULTIPLE TRANSMISSION CHANNEL GROUP TRANSMITTER

RELATION TO OTHER PATENT APPLICATIONS

This is a continuation in part application to the utility patent application entitled ADVANCED AUTOMOTIVE AUTOMATION AND SECURITY SYSTEM Ser. No. 07/945,667, having a filing date of Sep. 16, 1992, U.S. Pat. No. 5,534,845 and it is a continuation in part of the utility patent application entitled METHOD OF INDICATING THE THREAT LEVEL OF AN INCOMING SHOCK TO AN ELECTRONICALLY SECURED VEHICLE AND APPARATUS THEREFOR, Ser. No. 08/112,940, having a filing date of Aug. 30, 1993, U.S. Pat. No. 5,532,670 and it is a continuation in part of the utility patent application entitled ADVANCED METHOD OF INDICATING INCOMING THREAT LEVEL TO AN ELECTRONICALLY SECURED VEHICLE AND APPARATUS THEREFOR, Ser. No. 08/433,819 filed May 4, 1995, now abandoned, and it is a continuation in part of the utility patent application entitled OPERATOR UNIQUE CONTROL OF SECURITY SYSTEM AND CHANNEL LINKING OF USER SPECIFIC FUNCTIONS, Ser. No. 08/396,020, having a filing date of Feb. 28, 1995, and it is a continuation in part of the utility patent application entitled ALARM SENSOR MULTIPLEXING, Ser. No. 08/396,115, filed Feb. 28, 1995 and it is a continuation in part of the utility patent application entitled ADVANCED EMBEDDED CODE HOPPING SYSTEM, Ser. No. 08/425,597 filed Apr. 20, 1995.

BACKGROUND OF THE INVENTION

1. Field of the Invention

This invention pertains to the art of remote control transmitters. More particularly, this invention provides for discrete control of multiple devices from a single remote transmitter. Each code word contains a transmission channel code and an identification/security code particular to the device it controls.

2. Description of the Prior Art

Today people live in unprecedented conditions of high technology. In the last several decades technology has made life simpler, safer and more enjoyable. Items of luxury and convenience which were unaffordable and unreachable to many are now a commodity which is differentiated by its functionality and utility.

Among the technological strides of this revolution is the ability for the manufacturers to provide products capable of remote control. Examples of this are remote control alarm systems, door openers, televisions, stereos and the like. As more and more appliances reach the commodity stage and are affordable to more and more individuals, the number of the remote control transmitters continues to increase. As a result an average household may have a plurality of remote controllers to operate a plurality of appliances and devices.

A common drawback to having multiple remote transmitters is misplacing one or more of the transmitter or confusing one transmitter with another. People continue to live with this drawback because there has not been an adequate solution therefor.

Most remote control transmitter available up to now transmit up to the maximum allowable transmission channels limited by the number of channel control switches built therein. For example, a two button (control switch) transmitter is capable of transmitting two or three transmission channels. A three button transmitter is capable of transmitting from three to seven transmission channels, depending if its channel assignment is numerical or binary (three buttons provide eight combinations).

Some of the prior art transmitters have attempted to solve this problem. To operate multiple units, the commands to each unit were subdivided into transmission channel groups, where each group has a number of transmission channels, each transmitter channel controlling a specific function or group of functions within the device. Prior art transmitters have dedicated a switch or a button within the transmitter device to move from channel group to channel group. Once a group is chosen then another set of buttons or switches is used to execute or transmit channel commands to the controller of the device. As an example, one such transmitter uses one of two transmitter control switches (buttons) to step through the transmitter channel groups and it uses the second control switch to transmit the selected transmission channel within the selected channel group. Another multiple group transmitter has four transmitter control switches, one of which is used solely to select the transmission group, while the other three are used to control the transmission of the three transmitter output channels.

The drawback to these prior art devices is the dedication of at least one user controllable switch for selection of channel groups. This drawback is significant where the remote transmitters are limited in size. One such application is in the art of auto alarm systems where the remote transmitter is commonly moved about and carried in a person's pocket. Therefore, all the physical space on the remote transmitter is at a premium. To provide more buttons requires a higher cost per unit and requires a physically bigger transmitter.

The device of the present invention overcomes the heretofore mentioned problems. It provides for control of multiple units or controllers from a single remote and it provides for using the buttons on the face of the transmitter both for selecting the group of channels and the channels themselves without dedicating one or more of the buttons to the function of selecting a channel group.

SUMMARY OF THE INVENTION

The multiple transmission channel group transmitter of the present invention is an RF (radio frequency) remote control transmitter with the capability to select and transmit a plurality of transmission channels from one or more groups of channels without losing the functionality of each and every user operatable switch therein. This capability is not found in the prior art as described above. This capability is made possible by transmitting a code word, on release of the transmitter channel control switch(es) that initiates transmitter channel group program instead of transmitting while the transmitter channel control switch(es) are depressed, as is done in the prior art. In the preferred embodiment of this invention, the transmitter will transmit a code word for a predetermined period of time after the release of the transmitter control switch.

To select an alternate channel group, the switch is depressed for a predetermined amount of time without release. Thereafter the transmitter of the present invention enters into a channel group selection mode. Once the transmitter is in the selection mode there is no transmission after the button is released. Instead, the user is able to select from a plurality of channel groups.

Once a transmission channel group is selected, the transmitter exits its selection mode and is capable of transmitting channel commands from the selected channel group. Each channel group of the present device may contain all possible combinations of channels available for activation by the buttons/switches of the remote control transmitter, including the switches used to enter and select the channel groups.

As an example, the present invention device with a two (2) buttons has a three (3) channel capability, a three (3) button transmitter has a seven (7) channel capability, four (4) button transmitter has a fifteen (15) channel capability.

In the preferred embodiment of the present invention, each channel group has a unique remote control transmitter identification code. The identification code is also used as a security code such that unauthorized users do not gain access to the control of the device. The identification code comprises a number of bits, the combination of which is unique to the particular transmitter. Changing the identification code from channel group to channel group allows the operator of a two button transmitter to control multiple transmission channels within multiple channel groups, wherein each channel group has a unique identification code. This allows a single remote controller to operate a particular device without disturbing other devices which are equally responsive to this remote transmitter when it transmits channel commands from a channel group particular to that device. As an example, an operator may separately operate four remote controlled security systems on four (4) separate vehicles with a single transmitter. To address each separate vehicle, the operator selects the discrete vehicle channel group within his transmitter and proceeds to execute channel commands particular to the new transmission group selected.

It is therefore the object of this invention to provide for a remote control transmitter capable of having multiple channel groups, each having a unique and particular identification/security code therewith. It is an object of this invention to provide for a remote control transmitter having at least one switch therewith, wherein this switch has a standby mode and an operational mode and wherein the transmitter transmits a code word after the switch progresses from the standby mode to operational mode and back to standby mode, thereby transmitting information upon the release of the switch. It is further the object of this invention to provide a single remote control transmitter capable of operating multiple systems. It is the object of this invention to provide a miniature remote transmitter capable of transport on a key chain or within the user's pocket. It is the object of this invention to provide a remote control transmitter wherein all of its user control switches operate channel commands and/or are used to select groups of channels without dedicating specific switch(es) to a specific function.

DESCRIPTION OF PREFERRED EMBODIMENT

Figure 1:
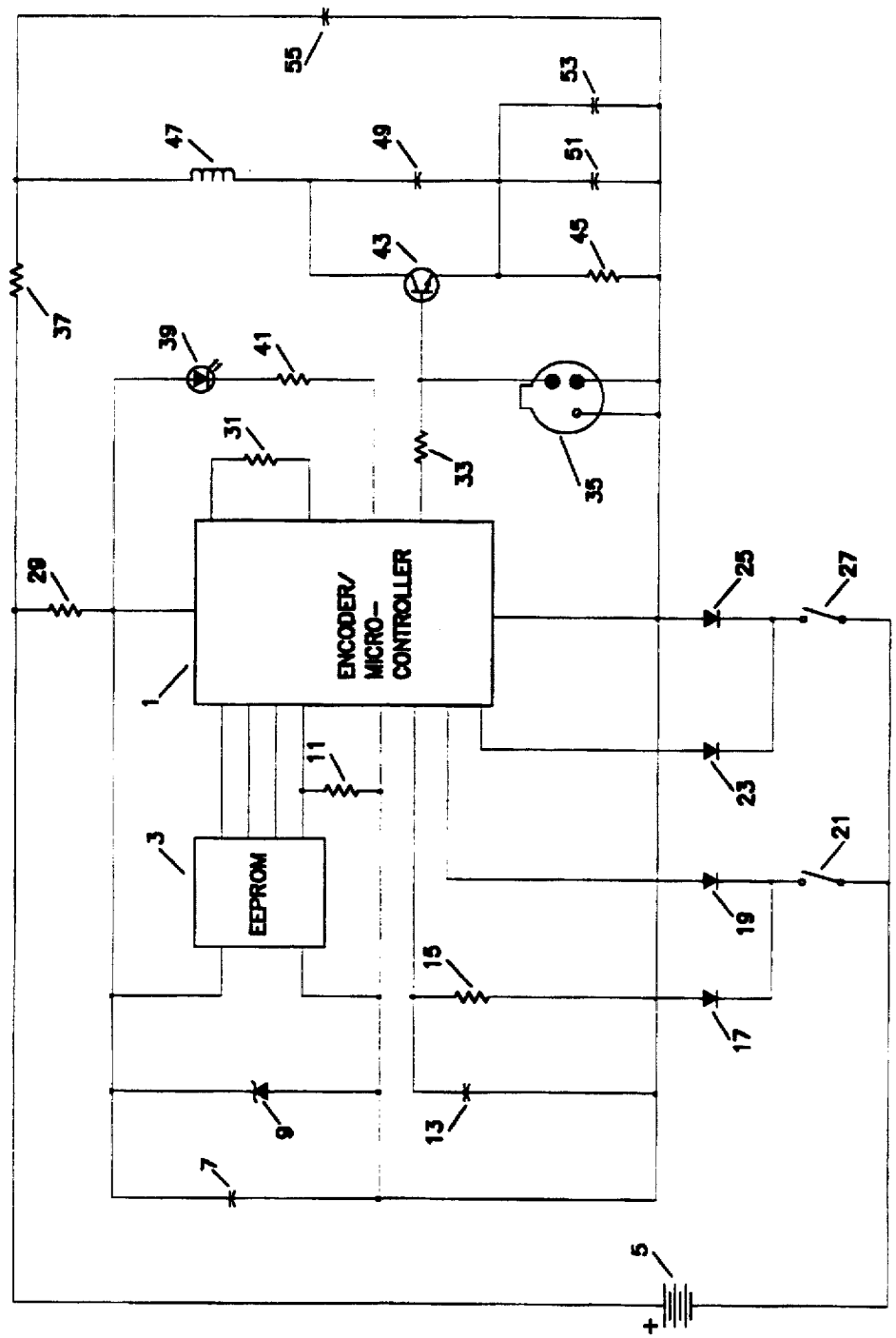
FIG. 1 is a schematic diagram of a two button, remote control transmitter.

The device of the preferred embodiment provides for a pocket sized transmitter having multiple transmission channel groups (hereafter "channel groups") therein, each channel group having a number of transmission channels (or commands) controllable thereby. In the preferred embodiment, the user selects the desired channel group to operate a device responsive to the transmission channels of that channel group. Therefore, the user may use one remote control transmitter of the present invention to operate multiple devices or systems. It is understood that a "channel" is a set of system functions executable by a system controller which receives instructions from the remote controller in a form of a transmission channel. It is also understood that an operator command is executed by the transmission channel which is selected in the remote control transmitter by exercising a group of user operatable switches in a predetermined combination. For example, a remote control transmitter having three switches is capable of sending seven ($2^3-1$) channel commands to the system controller. As heretofore described, the main object of this invention is to allow each user controllable switch of the remote transmitter to be used to select channels without dedicating a specific switch or switches for selection of a channel group. This eliminates the necessity of dedicating a specific user controllable switch for selection of channel groups. This is a significant feature within a miniature device because it is desirable to maximize the size of the switch without increasing the size of the transmitter. Additionally, it is the object of this invention to transmit the channel command to the controller after the switch is depressed and released and not while it is depressed. This allows the device to enter into a selection mode where the user can select a user group.

The remote control transmitter of the preferred embodiment employs two user controllable switches as do the majority of remote control transmitters in the marketplace today. The terms "buttons" and "switches" will be interchangeably used throughout this specification and carry identical meaning therein. In other embodiments of this invention more then two buttons may be employed. A two button transmitter is capable of transmitting three channels, ($2^2-1$). Most remote control systems of the prior art use at least two of the three transmission channel capability and use the third to select an alternate channel group. As an example, a home security system operator would control the garage door opener with one transmission channel and the arming and disarming of the security system with the second transmission channel. In another example, a vehicle security system operator controls the arming and disarming of the security system with one transmission channel and perform trunk release or some other function with transmission channel two.

The transmitter of the present invention having multiple groups of transmission channels can control as many separate remote control systems without compromising the ease of use found in a dedicated system transmitter. The benefit of the multiple channel transmitter is the lack of necessity of carrying multiple transmitters, each for use with its respective system. The present invention provides for operating multiple systems with a single transmitter. For example, a vehicle operator with several vehicles, each having a security system may program the transmitter of the present invention to operate the vehicle he is presently driving. If he chose to drive another vehicle, he would select the associated transmission channel group required to operate that particular vehicle security system. In either case the remote control transmitter codes for each system would have to be previously programmed into that vehicle security system.

An operator of the present invention selects a particular channel group, associated with a particular system, by entering into a selection mode. This is accomplished by activating a predetermined remote control transmitter control switch or switches (switches 1 and 2 in the preferred embodiment). Each switch of the preferred embodiment has two modes, a standby mode and an operational mode. The standby mode characterizes the switch when it is idle. The operational mode is characterizes the switch when it is activated. In the preferred embodiment, the switch is activated when it is depressed by the operator. In the preferred embodiment when the operator of the transmitter depresses and holds first and second switches 21 and 27 in the operational mode for a predetermined period of time such as three seconds, the transmitter enters the transmission channel group selection mode. In other embodiments depressing of a switch 21 and/or 27 will initiate certain functions which are determined by the manufacturer or the user. An example of the same is a panic mode which is initiated upon depressing a certain switch for a predetermined amount of time. Once in the selection mode, while continuing to depress switch 21, the user operates the second switch 27 or additional switches (not shown) and steps the transmitter through its channel groups by momentarily depressing and releasing this second switch, i.e. toggling the switch from its standby mode to its operational mode and back to its standby mode. The particular switch used to step through and select channel groups may be any one or any combination of any switches of the transmitter. The switch assignment for the switch selecting the channel groups is determined by the manufacturer. In another embodiment this assignment is in the field. This selection is achieved by grounding or not grounding the programming pins of the system encoder integrated circuit (IC); presetting of programming codes in the EEPROM (electrically erasable & programmable read only memory); or, by any one of other methods available in the art.

In the preferred embodiment, each transmission channel group has a unique security code and all channels therein have a common or a constant security code. The security/identification code is particular, different and unique to the transmitter, the system and the channel group. To achieve this can be as simple as changing a few bits from group to group or to have a completely unique random code for each group. In the preferred embodiment the location of the transmission channel identification bits are usually uniform from channel group to channel group within the same transmitter and are uniform with single group transmitters, so that the transmission channel being used can be identified with each transmission. This is necessary for the remote control system to perform the correct command regardless of the type of transmitter used.

FIG. 1 is a schematic of the physical components of a multiple transmission channel group transmitter. This embodiment of the multiple transmission channel group transmitter employs an EEPROM 3 to store the identification or security codes for the different transmission channel groups. Each transmission channel is transmitted to the system controller (not shown) in a form of a digital word having an n-bit length. This word is referred to as the code word. This code word comprises in part an identification or security code and channel identification code. The identification or security code may be the serial number of the transmitter or it may be any combination of digits, such that this code differs from transmitter to transmitter and from channel group to channel group. The channel identification code which will be read by the system controller and will instruct the controller to activate certain channels therein, such as arming and disarming the system and the like. Further codes and instructions can be appended therein as required by the application or the system.

Encoder 1 is a micro-controller that determines what group is transmitted at any given time. It reads the code from the EEPROM 3 and transfers the code sequentially out to an RF (Radio Frequency) Colpitts oscillator transistor 43 via an oscillator bias (base drive) resistor 33. SAW (surface acoustical wave) resonator 35 fine tunes the pre-tuned RF Colpitts oscillator to a tight frequency tolerance that could not otherwise be accomplished without a frequency control resonator or crystal. The pre-tuning elements of the RF Colpitts oscillator consist of an inductor 47, capacitors 49, capacitor 51, and capacitor 53. In the preferred embodiment the inductor 47 is a printed circuit board trace inductor that is also the antenna of the transmitter. In other embodiments these are separate components (not shown). Capacitor 55 and resistor 37 are RF isolation components that are employed to keep the RF out of the balance of the transmitter circuitry and to eliminate the crosstalk within the circuitry of the device. An emitter resistor 45 along with the capacitor 51 and the capacitor 53 establish a stable RF free reference on the emitter of the RF Colpitts oscillator transistor 43.

A battery 5 supplies power to the transmitter. It is usually a small 12 volt alkaline battery that is used throughout the auto security industry. A resistor 29 is a voltage dropping resistor for a power supply regulating zener diode 9 which regulates the power to 5 volts for the EEPROM 3 and the encoder 1. A capacitor 7 filters out the RF signal from the five volt supply. A resistor 15 and a capacitor 13 provide a reset on power up for the encoder 1. A resistor 11 provides a pull down on the clock signal that goes from encoder 1 to EEPROM 3. A diode 17, diode 19, diode 23, and diode 25 are all reverse input prevention diodes for the power input and transmission channel identification inputs to the encoder 1. In absence of these diodes there would be undesirable cross feed on the transmission channel identification inputs that would pull both inputs to ground either through encoder 1 or back feeding through the power input. Switches 21 and 27 are the transmitter control switches that activate the power to transmitter and provide transmission channel identification inputs to encoder 1. These switches have a standby mode and an operational mode. These switches are nominally in the standby mode until they are activated by the user. Most commonly, the activation is in a form of depressing the switch. Once the switch is depressed, it goes to an operational mode. When the user releases the switch(es) it/they return to a standby mode. The preferred embodiment employs spring loaded contact switches wherein the spring biases the switch to its nominal standby mode.

A resistor 31 is the clock frequency control resistor that establishes the clock oscillation frequency of encoder 1. An LED 39 is employed to visually signal the operator that the transmitter is powered, what transmission channel group is being transmitted, and while the transmitter is in the transmission channel group programming or selection mode, it signals to the operator the channel group that the transmitter is presently programmed to or is selected to transmit. In other embodiments of the invention, a piezo element (not shown) can serve the same function of communicating to the user the mode of the transmitter and the channel group in operation. The resistor 41 is a current limiting resistor for the LED 39.

Figure 2:
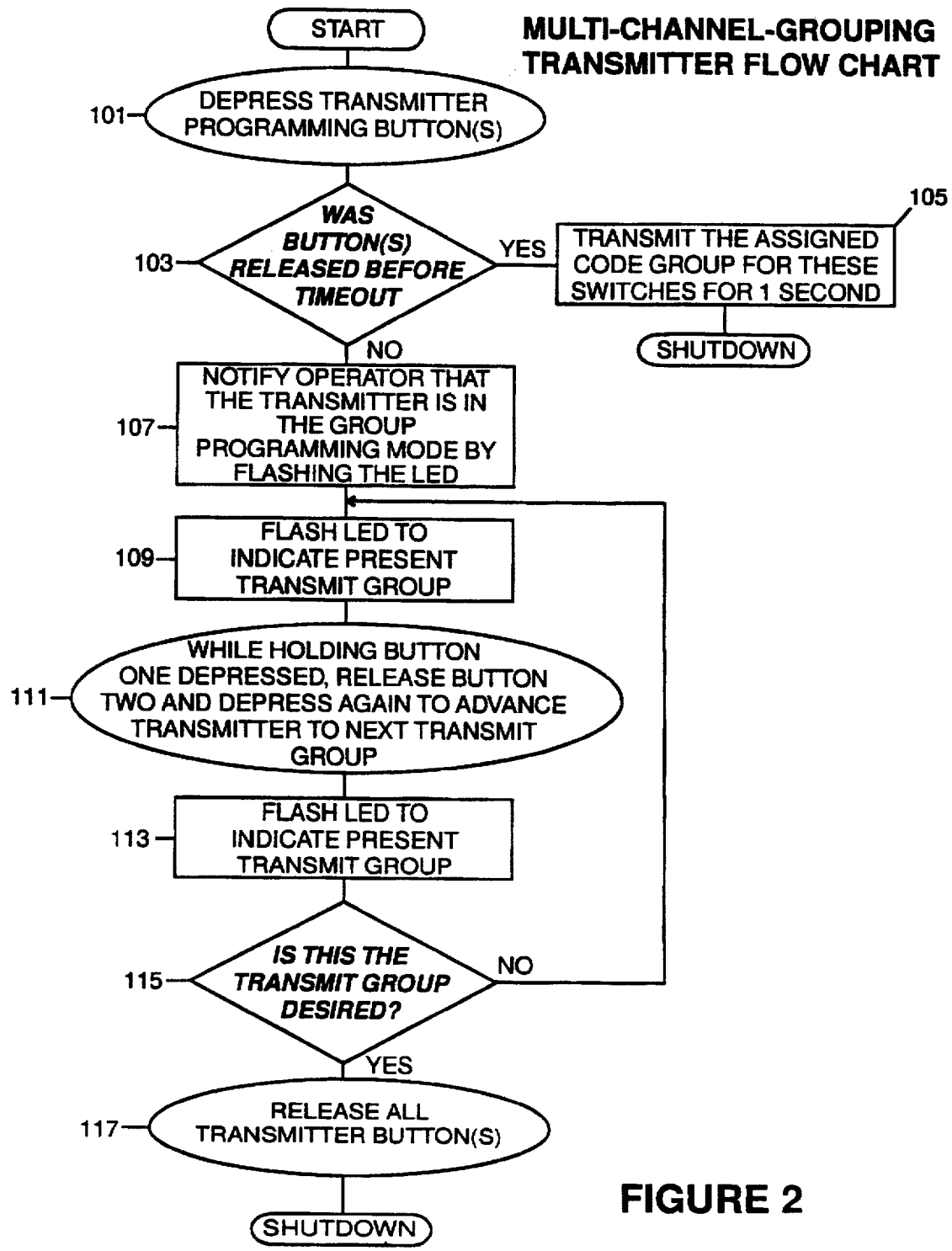
FIG. 2 is a flow chart of the selection mode for selecting channel groups of the remote control transmitter.

FIG. 2 is a flow chart of operator programming of the multiple transmission group transmitter. The oval blocks indicate an operator input, diamond blocks indicate a decision, and rectangle blocks indicate a transmitter action.

At 101, the operator depresses the transmission group programming initiation switches one and two (switches 21 and 27) in a combination for a particular channel execution. For example "1", "1" may disarm the system. The transmitter checks if the transmission group programming initiation switches 21 and 27 are released before the transmitter enters the selection mode. If they are released prior to the transmitter entering the selection mode, then the transmitter proceeds to transmit the assigned transmitter identification or security code along with the transmission channel code for a predetermined period of time (1 second in the preferred embodiment) after the switches 21 and 27 are released. This provides for the switches to go from a standby mode to operational mode and back to the standby mode. The actual RF transmission is initiated after the switches go from the operational mode to the standby mode. After the RF transmission is sent the transmitter shuts down.

If at 103, the programming mode entry timer times out before the switches are released from the operational mode back to standby mode, then the transmitter enters the group programming mode. In the preferred embodiment this is a predetermined amount of time either programmable by the manufacturer or the user. In the preferred embodiment the predetermined amount or period of time is three seconds which requires a conscious act by the user. At 107, the transmitter notifies the operator by flashing the LED 39, or in other embodiments by a piezo element (not shown), that the unit has entered the group selection mode. At 109, the transmitter continues to flash the LED 39 the number of times equal to the group that the transmitter is presently in. The selection mode cycle is then completed by a pause, and a count for the subsequent group, pause, . . . . At 111, the operator advances the transmitter from group to group by releasing one of the switches 21 and 27 (in the preferred embodiment switch 27), while continuing to hold switch one (in the preferred embodiment switch 21) depressed; then depresses switch two again to advance the group to the next higher group or reset it to group one, if it is the highest group. In other embodiments another switch (not shown) may be employed to step down instead of stepping up.

At 113, the transmitter again flashes the LED 39 to indicate the group presently selected by the operator. At 115, if this is the desired transmission channel group, then the operator releases all the transmitter switches at 117 and the transmitter shuts down. If it is not the desired group, then the operator continues to depress and release switch two until the correct group is selected, at which time he releases all transmitter switches and the transmitter shuts down. At that point, the transmitter is ready to transmit the transmission channels or commands within the selected transmission channel group.

For further disclosure and the preferred embodiments of code word transmission, receipt, encoding, decoding and channel execution, readers are referenced to the parent application of this inventions listed above and entitled "RELATION TO OTHER PATENT APPLICATIONS".

Accordingly, this invention provides for a method of selecting at least one group of transmission channels with at least one user controllable switch (either switch 21 and/or 27) usable for the selection of channel groups and transmission channels therein. This is accomplished by the user entering into the selection mode and selecting a transmission channel group having at least one transmission channel therein by transitioning the first switch 21, having a standby mode and an operational mode, from the standby mode into the operational mode for a minimum, predetermined Mount of time. Then the user selects a transmission channel group by transitioning the second switch 27 from the standby mode to the operational mode and back to the standby mode m+1 times which corresponds to n+1 channel group, while continuing to hold the first switch 21 in its operational mode. Once the group is selected, any combination of the switches 21 and 27 commands a different channel identification and thereby sends a different channel command. As previously described, a two switch transmitter can operate three channels; three switch transmitter can operate seven channels; . . .

After the channel group is selected, all switches of the transmitter can be used to select the channel commands to the controller, including the switch or switches used to enter the selection mode. In the preferred embodiment, the user or the manufacturer may assign a different security code for each channel group. Furthermore, in the preferred embodiment, the user or the manufacturer assigns the same security/identification code to all channels within the same channel group.

As disclosed in parent applications listed above, the operator may program the transmitter security codes within the system controllers which will be operated thereby. Therefore, if the transmitter is used with four different systems (for an example), it is programmed into four different channel groups, each having a unique security code therefor.

In the preferred embodiment of this invention, the alarm system may employ a plurality of functions. These functions may be exercised in a number of ways. One way to exercise these functions is to transmit control code words during the operational mode of the control switch(es). Another way is to transmit the code words when the switch or switches are pressed and released, as discussed above. This provides for a flexibility and assignment of various features to various control switches. Therefore, the combination of pressing switches 21 and 27, transmits code words after the switches are pressed and released, however pressing switch 21 and 27 independently of each other will transmit code words when the switch is depressed.

In another embodiment of this invention, a single switch transmitter can achieve the same function of selecting among channel groups and thereafter executing channel commands. This is achieved as above by depressing the single switch for a predetermined period of time and thereafter selecting a channel group by momentarily depressing and releasing the switch. After a period of inactivity, the transmitter will exit the group selection mode and will operate as a normal remote control transmitter with the capability of transmitting all the transmission channels within the selected channel group.

Yet in another embodiment of this invention a multiple switch transmitter enters its selection mode by depressing a single switch for a predetermined amount of time as described in the latter paragraph. Thereafter any or all of the switches may be operated in a combination to achieve user desired functions including channel group selection.

While the invention has been described by reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve the same results are within the scope of this invention.

What is claimed is:

1. A miniature, remote control transmitter for control of an antitheft auto security device, comprising:

a) a miniature remote control transmitter having at least one switch and at least one transmission channel for transmission of commands to an antitheft auto security device;

b) a plurality of transmission channel group, programmed in said transmitter, each said channel group having at least one said transmission channel therein;

c) said switch having at least two functions: p2 (i) first said function comprising transmission of said transmission channel to said antitheft device, only upon transition of said switch from a standby mode to an operational mode and back to said standby mode, and p2 (ii) second said function comprising selection of one of said plurality of transmission channel groups programmed in said transmitter, only upon transition of said switch from said standby mode to said operational mode for a predetermined amount of time.

2. The device of claim 1 wherein said transmitter further comprises an RF emitter, an encoder and a memory for storing said transmission channel groups and transmission channels.

3. The device of claim 1 wherein each said transmission channel within each said transmission channel GROUP further comprises a unique security code.

4. The device of claim 1 wherein said transmission channel further includes a channel identification code.

5. The device of claim 3 wherein said security code is unique for each said transmission channel group.

6. The device of claim 1 further including a security code within each said transmission channel, wherein said security code is unique for each said transmission channel of each said transmission channel group.

7. The device of claim 2 further including a security code assigned to each said transmission channel group.

8. The device of claim 1 further including means for selecting said transmission channel group and said transmission channel therein.

9. The device of claim 8 wherein said means for selecting said transmission channel group comprises said first switch for entering into a selection mode when said fist switch is placed in said operational mode for said predetermined amount of time and a second switch for selecting one of said transmission channel groups while the unit is in said selection mode.

10. The device of claim 9 wherein said first transmitter switch has at least two functions:
  (i) first said function comprising transmission of said transmission channel to said antitheft device, only upon transition of said switch from a standby mode to an operational mode and back to said standby mode, and
  (ii) second said function comprising selection of one of said plurality of transmission channel groups within said transmitter, only upon transition of said switch from said standby mode to said operational mode for a predetermined amount of time.

11. The device of claim 1 wherein said switch is usable for selecting said transmission channel group and for selecting said transmission channel.

12. A method of controlling at least one antitheft auto security device through a miniaturized remote control transmitter having at least one switch usable both for the selection of channel groups and transmission channels therein, comprising the steps of:
  a) placing a miniature remote control transmitter into a selection mode and selecting a transmission channel group, having at least one transmission channel therein, by transitioning at least one switch in said transmitter from a standby mode to an operational mode for a predetermined amount of time;
  b) selecting a transmission channel group by transitioning said switch from said standby mode to said operational mode while said transmitter is in said selection mode;
  c) exiting said selection mode by not operating said switches for a predetermined period of time;
  d) transmitting said transmission channel, within a selected transmission channel group, only by transitioning said switch from said standby mode to said operational mode to said standby mode.

13. The method of claim 12 wherein the step of selecting said transmission channel is completed only upon transitioning said switch, used to select said transmission channel group, from said standby mode to said operational mode to said standby mode.

14. The method of claim 12 wherein the step of selecting said transmission channel group includes the step of transitioning said switch from said standby mode to said operational mode to said standby mode until the desired channel group is selected.

15. The method of claim 12 wherein said transmission channel includes a security code therein.

16. The method of claim 15 further including the step of assigning a unique security code for each said transmission channel group.

17. The method of claim 15 further including the step of assigning the same security code for each said transmission channel within each said transmission channel group.

18. A method for controlling at least one auto security device, each having a controller therein and a different security code therefor, with one miniaturized, remote control transmitter, comprising the steps of:
  a) programming a remote transmitter with unique security codes for operation of n controllers;
  b) programming each said controller with at least one of said n security codes;
  c) placing said transmitter, having at least one switch therein, into a selection mode by transitioning a first switch from a standby mode to an operational mode for a predetermined amount of time;
  d) selecting one of n transmission channel groups, while said transmitter is in said selection mode, by transitioning said first switch from said standby mode to said operational mode to said standby mode n times;
  e) exiting said selection mode by waiting a predetermined amount of time without transitioning any said switches:
  f) transmitting a transmission channel, within said selected transmission channel group, to said controller by transitioning said first switch from said standby mode to said operational mode to said standby mode, said transmission channel activating controller operational functions.

19. The method of claim 18 further including the step of selecting said transmission channels by transitioning said transmitter switches from said standby mode to said operating mode to said standby mode.

20. The method of claim 18 further including the step of selecting said transmission channel group by transitioning a second switch from said standby mode to said operational mode to said standby mode.

21. The method of claim 18 wherein said transmission channel includes a security code.

22. The method of claim 18 further including the step of assigning a the same security code for each said transmission channel within each said transmission channel group.

23. A method of selecting at least one transmission channel group and at least one transmission channel therein, in a vehicular anti theft device, controllable by a miniaturized remote control transmitter, with a plurality of switches each usable for selecting channel groups and transmission channels therein, comprising the steps of:
  a) placing a miniature remote control transmitter into a selection mode and selecting a transmission channel group, having at least one transmission channel therein, by transitioning a first transmitter switch from a standby mode to an operational mode for a predetermined amount of time;

b) selecting one of n transmission channel groups, while said transmitter is in said selection mode, by transitioning said first transmitter switch from said standby mode to said operational mode to said standby mode;

c) exiting said selecting mode by not operating said switches for a predetermined amount of time without transitioning any said transmitter switches; and d) transmitting said transmission channel within a selected transmission channel group, only by transitioning at least one said transmitter switch from said standby mode to said operational mode to said standby mode, said transmission channel activating operational functions of an antitheft auto security device.

24. The method of claim 23 wherein the step of selecting said transmission channel includes using at least one additional transmitter switch either alone or together with said first transmitter switch, to select said transmission channel group, by transitioning said transmitter switches from said standby mode to said operational mode to said standby mode.

25. The method of claim 23 wherein the step of selecting said transmission channel includes transitioning said switches in combination.

26. The method of claim 23 wherein the step of selecting said transmission channel group includes the step of selecting a desired transmission channel group by transitioning a second transmitter switch times from said standby mode to said operational mode and exiting said selection mode by transitioning said first transmitter switch from said operational mode to said standby mode after said desired channel group is selected.

27. The method of claim 23 wherein said transmission channel includes a security code therein.

28. The method of claim 27 further including the step of assigning a unique security code for each said transmission channel group.

29. The method of claim 27 further including the step of assigning the same security code for each said transmission channel within each said transmission channel group.

* * * * *